Dec. 15, 1964   J. A. HAMILTON   3,161,122
PHOTOGRAPHIC PROCESS

Filed Nov. 23, 1962   3 Sheets-Sheet 1

INVENTOR.
Joel A. Hamilton
BY
Brown and Mikulka
and
Robert E. Corb
ATTORNEYS

Dec. 15, 1964   J. A. HAMILTON   3,161,122
PHOTOGRAPHIC PROCESS
Filed Nov. 23, 1962   3 Sheets-Sheet 2
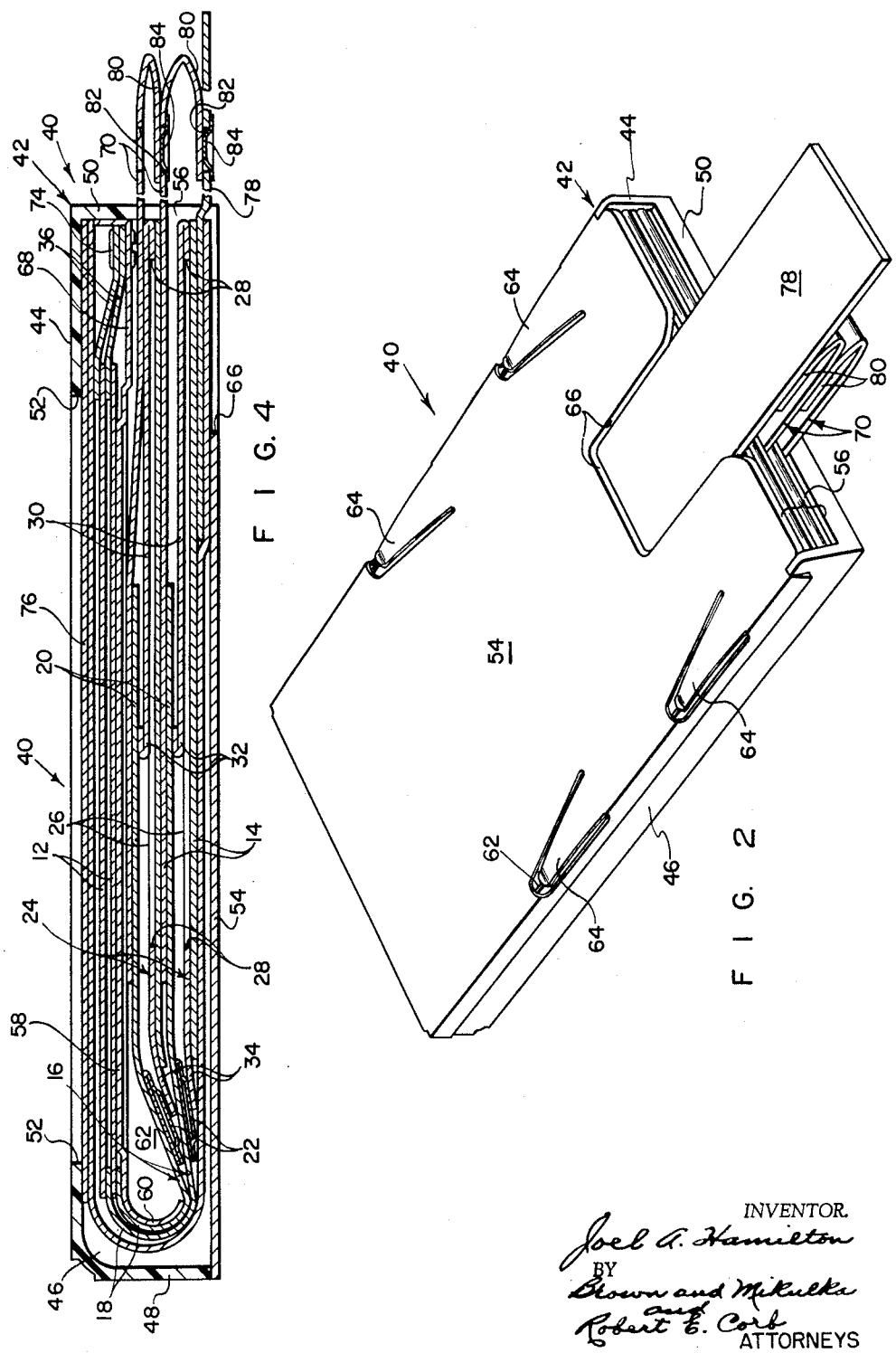
INVENTOR.
Joel A. Hamilton
BY Brown and Mikulka
and Robert E. Corb
ATTORNEYS

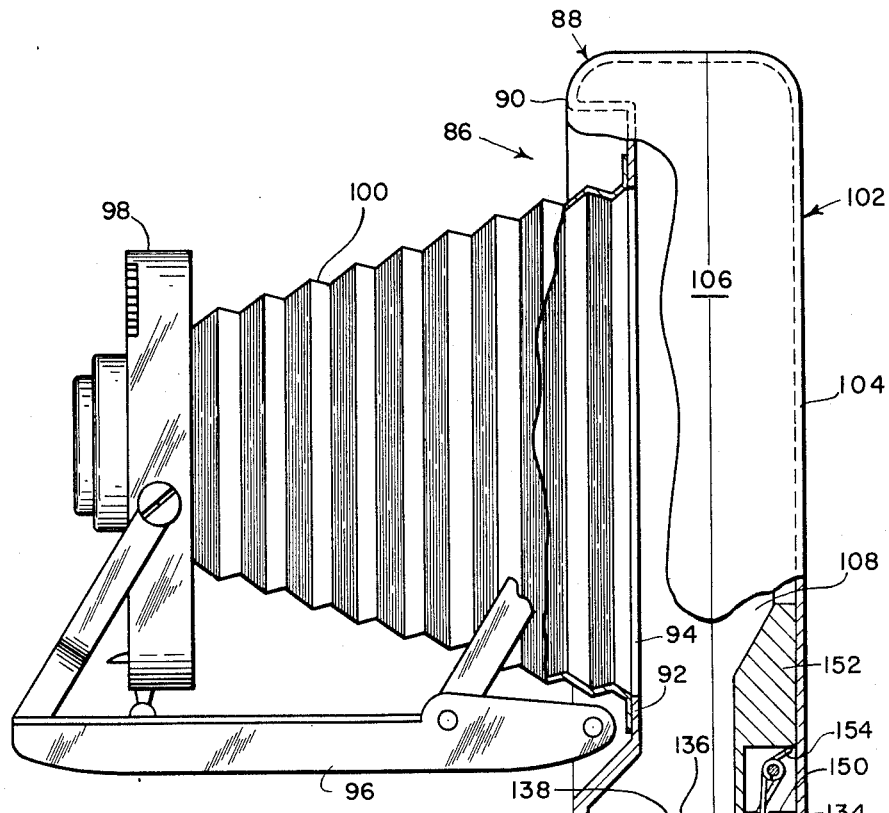
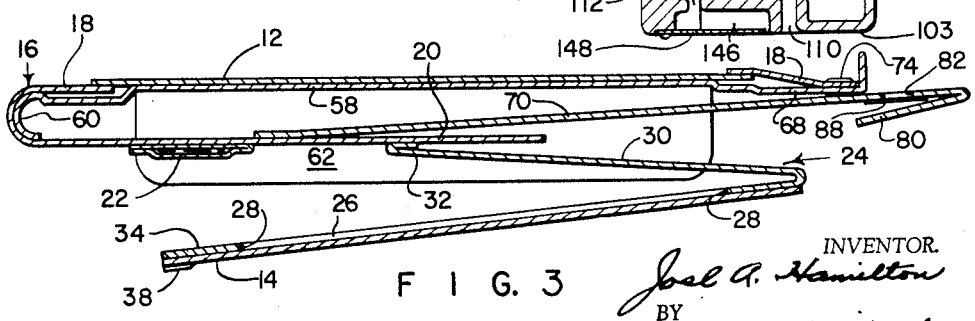

United States Patent Office

3,161,122
Patented Dec. 15, 1964

3,161,122
PHOTOGRAPHIC PROCESS
Joel A. Hamilton, West Medway, Mass., assignor to Polaroid Corporation, Cambridge, Mass., a corporation of Delaware
Filed Nov. 23, 1962, Ser. No. 239,443
5 Claims. (Cl. 95—89)

This invention relates to photographic methods and more particularly to novel and improved methods of treating photographic film assemblages.

This application is a continuation-in-part of my copending application Serial No. 112,941, filed May 26, 1961, now Patent No. 3,080,805, issued March 12, 1963.

In the aforementioned application, there is shown and described photographic apparatus in the form of a camera including a pair of pressure-applying members between which a film assemblage is withdrawn from the camera for distributing a processing liquid within the film assemblage. Manual withdrawal of a film assemblage from within a camera such as this, toward and between a pair of pressure-applying members in the form of rolls, and directly from the camera, presents the problem of proper "tracking" of the film assemblage during withdrawal between the pressure-applying rolls. The pressure-applying rolls are generally positioned with their axes in a plane; and, once the film assemblage is in the grip of the rolls, it is movable only in a direction perpendicular to the roll axes. The film assemblages of the type generally employed in such apparatus generally comprise lateral edges throughout the major portion of their length which are substantially straight and parallel so that if the film assemblage is to be withdrawn without damage or mutilation, the film assemblage should be oriented, during withdrawal movement between the pressure-applying rolls, with its lateral edges perpendicular to the aforesaid plane, that is, parallel with the direction of movement of the film assemblage between and in the grip of the pressure-applying rolls. The film assemblage is likely to become improperly oriented prior to being gripped by the rolls during movement toward and between the rolls since such movement is manual and the motive force may be misdirected.

An object of the invention is to provide in a photographic process in which a photographic film element is manually moved within a photographic apparatus toward and between a pair of juxtaposed pressure-applying rolls and directly from the apparatus, a novel and improved method of manually moving the film element between and into the grip of the rolls in such a way that the film element is properly oriented with respect to the direction of movement of the film element between the rolls in the grip thereof.

Another object of the invention is to provide a method of the type described in which the film element is manually advanced within the apparatus toward and between the pressure-applying rolls, and this advancement is arrested just short of the point at which the film element is gripped by the rolls whereupon the manually applied withdrawal force is discontinued to permit proper orientation of the film element.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a perspective view of a film pack comprising an assemblage of film units;

FIG. 3 is a diagrammatic sectional view taken substantially midway between the sides of the film pack showing one film unit with the components thereof spaced apart to illustrate more clearly the construction, arrangement and operation of the film unit;

FIG. 4 is a longitudinal sectional view taken substantially midway between the sides of the film pack of FIG. 2;

FIG. 5 is an elevational view, partially in section, of photographic apparatus in the form of a camera for practicing the method of the invention.

Figure 1:
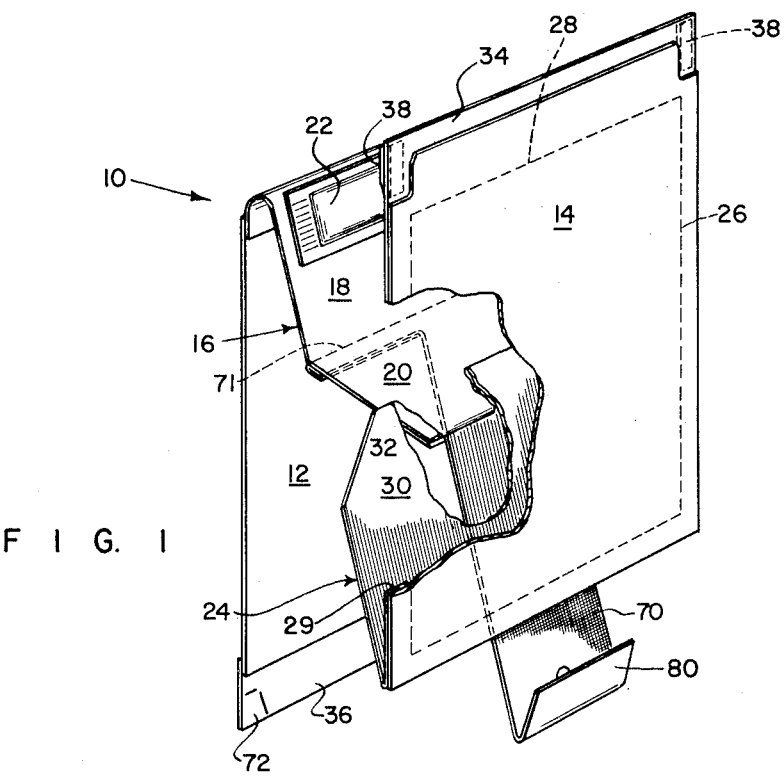
FIGURE 1 is a fragmentary perspective view of a photographic film unit useful in the method of the invention.

The present invention finds utility in photographic apparatus such as cameras in which a film element or assemblage is moved within the camera toward and between a pair of juxtaposed pressure-applying rolls and directly from the camera at the rolls by a tensive force applied manually to a leader attached to the film element or assemblage. The rolls engage and apply compressive pressure to the film element to distribute a liquid-processing composition in contact therewith. The direction of movement of a film element held in the grip of the pressure-applying rolls is, of course, perpendicular to the axes of the rolls so that the film element or assemblage, which is usually rectangular, should be oriented during withdrawal with its linear, parallel, lateral edges disposed substantially perpendicular to the axes of the rolls in order to prevent mutilation of the element due to engagement of the lateral edges with portions of the apparatus. Improper orientation is most likely to occur due to misdirection of the manually applied withdrawal force during movement of the element prior to gripping thereof by and between the pressure-applying rolls, whereafter changes in film element orientation become virtually impossible.

The solution to the problem of proper "tracking," i.e., orientation of the film element during withdrawal movement, lies in guiding the film element and adjusting its orientation prior to gripping of the film element by the rolls in spite of and in opposition to any misdirected manually applied withdrawal force. This can be accomplished to a small extent by applying the withdrawal (tensive) force to the film element at a point thereon spaced from the leading end thereof toward the trailing end thereof so that the component of the withdrawal force tending to cause lateral movement of the leading end of the film element is reduced to a minimum and any lateral force tending to guide or restore the leading end of the film element to proper orientation or alignment is not required to be as great in order to overcome the mistracking force. However correct orientation is assured according to the invention by discontinuing the application of the withdrawal (and hence misaligning) force immediately prior to gripping of the film element by and between the pressure-applying rolls so that restoring forces exerted on the film element tending to properly orient the film element are given an opportunity to restore the element to its proper orientation. Withdrawal movement of the film element is interrupted when a leading end portion thereof is moved between the pressure-applying rolls to a position just short of the position at which the pressure-applying rolls grip the film element so that when withdrawal movement is resumed the pressure-applying rolls immediately grip the film element before it can be improperly oriented due to a misdirected withdrawal force. It is during the interval between the withdrawal steps that forces are applied to the film element to move it laterally (with respect to the direction of withdrawal) to properly orient the film element for withdrawal.

Two-step, interrupted withdrawal of the film element can be insured by providing a leader attached to the film element and adapted to be pulled to accomplish the first withdrawal step. The leader, film element and apparatus are constructed so that the leader becomes detached at the proper instant when the leading end portion of the film element has been advanced between the pressure-applying rolls without being gripped thereby, to the extent that the leading end portion can thereafter be manually engaged exterior of the pressure-applying rolls for completing withdrawal of the film element between the rolls. The construction of such a film assemblage and apparatus and a method of loading a plurality of such film assemblages into the apparatus and withdrawing them one at a time and in succession and adapted to the method of the present invention, are shown and described in the copending U.S. patent application of Richard R. Wareham, Serial No. 715,370 filed February 14, 1958, now Patent No. 3,079,849, issued March 5, 1963. In this application, a plurality of unconnected film assemblages, each including a leader attached to the film assemblage at a position thereon spaced from the leading end of the assemblage, are loaded into photographic apparatus, such as a camera, with the film assemblages disposed to the inside of the pressure-applying members and the leaders extending past and to one side of both of the pressure-applying members from the apparatus where the leaders may be grasped for drawing the film assemblages from the apparatus between the pressure-applying members.

As a film element is advanced within the apparatus (camera) toward the pressure-applying rolls, a number of components of the apparatus and/or an assemblage of which the film element is a component, engage, guide and tend to properly orient the film element; and the forces applied to the film element by these components are usually sufficient to properly orient the film element in the absence of a misaligning force. To insure discontinuance of the application of any misdirected withdrawal force, the leader which is pulled initially to advance the film element is detached from the film element when the first withdrawal step is complete. The film element, leader and apparatus are all constructed so that leader detachment occurs automatically and at the proper time, that is, when withdrawal movement of the film element is arrested just prior to the gripping of the film element by the pressure-applying rolls, and at a position wherein only a very slight advance of the film element is required for gripping of the film element by the pressure-applying rolls.

Reference is now made to FIGS. 1 through 4 of the drawings wherein there are illustrated a film unit and an assemblage of film units in the form of a pack useful in the method of the invention. Each film unit, designated 10, comprises a generally rectangular photosensitive sheet 12 and a second or print-receiving sheet 14. Both of these sheets comprise a support which is opaque to light actinic to the photosensitive material of the photosensitive sheet. This photosensitive material comprises a layer of any of the conventional photographic recording media, gelatino silver halide emulsions being the preferred material, carried on a light-opaque flexible sheet such as paper, organic plastics and the like. The second or print-receiving sheet may merely serve to aid in the distribution of a processing fluid in contact with the photosensitive layer or, in the preferred form of film unit, comprises means for supporting a transfer image formed, for example, by a silver halide diffusion transfer-reversal process. Attached to the leading edge of photosensitive sheet 12 is a leader sheet 16 having a first section 18 at which leader sheet 16 is coupled with the photosensitive sheet. First section 18 is approximately equal in width to the photosensitive sheet and provides means for mounting a rupturable container 22 of processing fluid. Leader sheet 16 also includes a tapered end section 20. Second sheet 14 is mounted on a carrier sheet 24 having an intermediate section 26 approximately equal in width to second sheet 14 and having a generally rectangular opening 28 therein defining the area of the second sheet in which image formation occurs. Second sheet 14 is secured to intermediate section 26 so that the portions of the intermediate section bordering on opening 28 provide a mask for defining the image area and cooperating in spreading of the processing fluid. Carrier sheet 24 includes a leading end section 30 having a tapered end portion 32 similar to tapered end section 20 and secured thereto intermediate the ends of tapered end section 20 and tapered end portion 32 of leading end section 30. Tapered end section 20 and end portion 32 cooperate to define the leading end section of the film unit which is advanced between the pressure-applying members.

The length of leader sheet 16 between the leading edge of photosensitive sheet 12 and the point of attachment of the leader sheet to carrier sheet 24 is substantially equal to the length of carrier sheet 24 between its point of attachment to the leader sheet and the leading edge of second sheet 14. It is by virtue of this arrangement that the photosensitive and second sheets are superposed in registered relation during the processing of the film unit. A trailer sheet 36 is provided secured to the trailing edge of photosensitive sheet 12 and cooperates with a trailing end section 34 of carrier sheet 24 which extends beyond the trailing edge of the second sheet, to trap any excess processing fluid which may be carried beyond the trailing ends of the photosensitive and second sheets during distribution of the processing fluid. Distribution of the processing fluid, as noted, is effected by advancing the photosensitive and second sheets and container of processing fluid in superposition relative to and between a pair of juxtaposed pressure-applying members. The members apply compressive pressure to the sheets progressively, commencing in the area of the container, to cause the ejection of the fluid contents of the container between the sheets and the spreading of the fluid in a layer between and in contact with the sheets. To aid in trapping of excess fluid, spacing members 38 are provided on trailing end section 34 adjacent the margins thereof for spacing apart the pressure-applying members to provide a gap between trailing end section 34 and trailer sheet 36 in which any excess processing fluid may be collected and retained.

The rupturable container 22 is of the type shown and described in Patent No. 2,543,181, issued February 27, 1951, in the name of Edwin H. Land, and comprises a rectangular blank of fluid- and air-impervious sheet material folded longitudinally upon itself to form two walls which are sealed to one another along their longitudinal and end margins to form a cavity in which the processing fluid is contained. The longitudinal marginal seal is made weaker than the end seal so as to become unsealed in response to hydraulic pressure generated within the fluid contents of the container by the application of compressive pressure to the walls of the container. Container 22 is mounted on first section 18 of leader sheet 16 with this longitudinal marginal seal directed toward the leading edge of the photosensitive sheet.

The fluid contents of the container are preferably adapted to effect the formation of a transfer image on print-receiving sheet 14 in the area thereof defined by opening 28 in carrier sheet 24. For details concerning the composition of the fluid and materials useful for the photosensitive and print-receiving sheets and the processes performed by such materials, reference may be had to the above-mentioned Patent No. 2,543,181 and to Patent No. 2,662,822, issued December 15, 1953, in the name of Edwin H. Land.

A film pack or assemblage of film units 10 is shown in FIGS. 2 and 4 of the drawings. This film pack, designated 40, comprises a generally parallelpiped-shaped container or box 42 for holding and enclosing a plurality of film units 10. Container 42 is shown as comprising two sections, including a forward section having a forward wall 44, side walls 46, a trailing end wall 48, and a leading end wall 50. Forward wall 44 is provided with a generally rectangular exposure aperture 52 for transmitting light for exposing the photosensitive sheets of film units carried within the container. Leading end wall 50 comprises only a partial wall, i.e., it does not extend rearwardly to the same extent as the side walls, which cooperates with the rear section of the container to provide a passage 56 at the leading end of the container through which film units carried by the container are withdrawn. The rear section of the container comprises a rear wall 54 secured to side walls 46 and formed preferably of a resilient sheet metal.

The arrangement of each film unit within container 42 is illustrated in FIGS. 1, 3 and 4; and the arrangement of a plurality of film units (two are shown) is illustrated in FIG. 4. Each film unit is arranged with the photosensitive and second sheets in overlying relation with the photosensitive surface of the photosensitive sheet facing outward and with the surface of the print-receiving sheet which is superposed therewith, during processing, facing inwardly in the same direction. Leader sheet 16 is folded or curved adjacent the leading edge of photosensitive sheet 12 intermediate that edge and container 22, and carrier sheet 24 is similar folded adjacent the leading edge of second sheet 14 so that the portions of the leader sheet and carrier sheet which connect the photosensitive and second sheets lie therebetween; and the leading and trailing ends of the photosensitive sheet are disposed adjacent, respectively, the trailing and leading ends of the second sheet. The film pack is provided with a generally flat, rectangular pressure plate 58 located intermediate photosensitive sheet 12 and the other portions of the film unit for supporting the photosensitive sheet against the inner surface of forward wall 44 in position for exposure through aperture 52. Pressure plate 58 includes a rolled end section 60 around which extends the curved portion of leader sheet 16. Rolled end section 60 is provided for guiding photosensitive sheet 12 around the end of the pressure plate in a manner to be described hereinafter. The major portion of first section 18 of leader sheet 16, rupturable container 22 mounted thereon, tapered section 20 and the leading end section 30 of carrier sheet 24 are located behind pressure plate 58 between the latter and second sheet 14. Pressure plate 58 is provided with lateral flanges 62 disposed adjacent side walls 46 of the container. Rear wall 54 of the housing is provided with springs 64 formed from the rear wall and biased inwardly for engaging lateral flanges 62 and biasing pressure plate 58 toward forward wall 44 to retain the photosensitive sheet in position for exposure. Rear wall 54 is also provided with a U-shaped opening or enlarged notch 66 in the end portion thereof adjacent opening 56, the purpose of opening 66 to be described hereinafter.

As a means for withdrawing each film unit from the container with the photosensitive and print-receiving sheets in superposition and advancing tapered end section 20 between a pair of pressure-applying members, each film unit is provided with a relatively narrow elongated leader 70 secured at the trailing end of the leader to tapered end section 20 intermediate first section 18 and the point of attachment of the tapered end section to tapered end portion 32. Leader 70 may be T-shaped, as shown, at its trailing end, with laterally extending arms 71 at which the leader is adhered to the tapered end section. Leader 70 extends from container 42 through opening 56 therein and, when drawn from the container, advances a photosensitive sheet 12 around rolled end section 60 of pressure plate 58 into superposition with a second sheet 14 and then advances the two sheets in superposition within the container towards opening 56. As leader 70 commences to advance towards opening 56, tapered end portion 32 of carrier sheet 24 is required to break (bend) and commence rolling upon itself toward the opening in response to movement of tapered end section 20 of leader sheet 16 toward the same opening. It is for this reason that section 20 and portion 32 are tapered, since tapering provides for the weakest portion of end portion 32 in the area where the end portion is required to commence rolling. Means are also provided for preventing movement of photosensitive sheets underlying the foremost photosensitive sheet as the latter is moved from exposure position around the end of the pressure plate. This means comprises an end section 68 of pressure plate 58 to which are attached corner portions 72 of trailing end sections 34. Corner portions 72 are precut to insure separation from the remainder of trailing end section 34 and may be secured to end section 68 of the pressure plate by suitable means such as staples 74.

Film pack 40 is provided with means for initially sealing aperture 52 against the admission of light until the pack has been loaded into the camera in which it is to be employed. These light-sealing means comprise a cover sheet 76 (double) of a light-impervious material located between the foremost photosensitive sheet and forward wall 44 across opening 52. Cover sheet 76 extends around the curved end of the pressure plate behind the latter to a position against rear wall 54 with the leading end of the cover sheet located adjacent passage 56. An elongated leader 78, similar to leader 70, is secured to cover sheet 76 at a position thereon spaced inwardly from the leading end of the cover sheet to provide means for withdrawing cover sheet 76 from container 42 after the container has been loaded into a camera.

Figure 6:
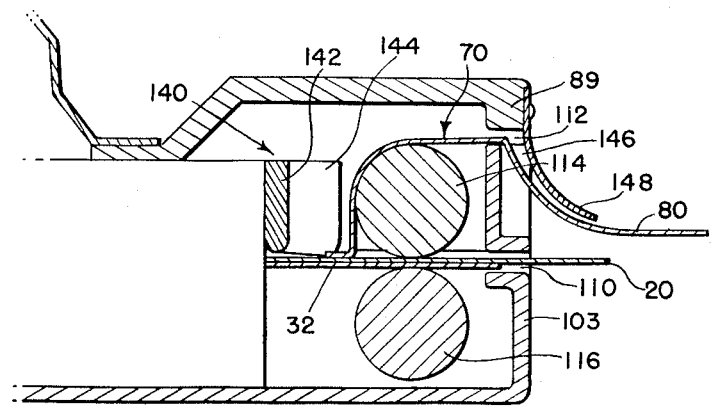
FIG. 6 is a fragmentary sectional view, similar to FIG. 5, illustrating another embodiment of the camera.

Apparatus useful in performing the method of the invention is illustrated in FIGS. 5 and 6, in the form of a hand-held camera designated 86, comprising a housing including a forward section 88 having a forward wall 90 with a recessed or reentrant section 92 and an aperture 94 in the reentrant section for transmitting light for exposing the photosensitive sheets of a film pack positioned for exposure within the camera. A hinged door 96 is provided for covering recessed section 92 and for mounting a conventional lens and shutter assembly 98, the latter being connected to recessed section 92 by a collapsible bellows 100 secured at one end to the lens and shutter assembly and secured at its other end to the recessed section in surrounding relation to aperture 94. In lieu of door 96, lens and shutter assembly 98 and bellows 100, the camera housing can be constructed in the form of a camera back or film pack adapter intended to be mounted on or coupled with a camera or other photographic exposure device.

The camera housing includes a rear section 102 having a rear wall 104 and side walls 106 cooperating with forward housing section 88 to provide a chamber 108 to the rear of forward wall 90 and aperture 94 for containing the film pack in position for exposure through aperture 94. Film pack 40 is mounted within chamber 108 with the wall of the pack located against the rear surface of reentrant section 92 and with aperture 52 is the forward wall of the pack aligned with aperture 94. Rear housing section 102 is preferably pivotably secured to forward housing section 88 adjacent one end of the housing, herein shown and designated for purposes of description as the upper end, by a hinge which permits the two housing sections to be moved apart from one another to allow loading of a film pack into chamber 108. The camera housing includes a lower end wall comprising end wall 89 on forward housing section 88 and another end wall 103 on rear housing section 102. A film withdrawal passage 110 is provided in lower end wall 103 of the housing to permit withdrawal of a film unit from the housing. Suitable latch means (not shown) of a conventional type are also provided in the lower portion of the housing for retaining the two housing sections together in the closed or operative position shown in the drawings.

Camera 86 includes a pair of juxtaposed pressure-applying members in the form of pressure-applying rolls 114 and 116 mounted within chamber 108 adjacent film withdrawal passage 110. Pressure-applying rolls 114 and 116 are mounted for pivotal movement with their axes substantially in a common plane, and resilient means are provided for biasing the rolls toward one another into juxtaposition so as to apply compressive pressure to a film unit during movement thereof between the rolls. The pressure-applying rolls cooperate to form a convergent (and divergent) passage through which the film unit is moved for effecting the processing of the film unit, and this passage between the pressue-applying rolls is located in substantial alignment with withdrawal passage 110. In the arrangement of the pressure-applying rolls shown in the drawings, both rolls are mounted on rear housing section 102 so that when the housing sections are pivoted apart from one another, an assemblage of film units may be loaded into the camera with the leaders thereof extending from the camera past and to one side (forward) of the pressure-applying rolls. Portions of end walls 89 and 103 cooperate to define an opening 112 between the forward and rear housing sections through which the leaders extend from the camera housing.

The pressure-applying rolls shown in the drawings are initially a predetermined minimum distance apart, at least at their medial or intermediate sections, to permit advancement of the leading end section of a film unit between the rolls. The intermediate sections of the rolls which cooperate to spread the processing fluid are substantially cylindrical and of uniform diameter throughout their lengths. The intermediate, uniform-diameter section of roll 114 has a length exceeding the width of opening 28 in intermediate section 26 of carrier sheet 24. The uniform-diameter, intermediate section of roll 116 is slightly shorter but nevertheless exceeds the width of opening 28 and may be provided at its ends with short sections or collars (not shown) each of which has a diameter slightly in excess of the diameter of the intermediate section of roll 116. This difference in diameter is on the order of a few thousandths of an inch and is provided for the purpose of spacing the intermediate sections of the rolls apart from one another by a predetermined amount to provide a space between the photosensitive and second sheets in which the processing fluid is distributed. The collars are supported on the marginal portions of the photosensitive sheet overlying the marginal portions of intermediate section 26 of carrier sheet 24 bordering opening 28 so that the depth of the space between the photosensitive and second sheet and the thickness of the layer of fluid spread therein, is a function of the diameter of the collars and the thickness of the carrier sheet.

The pressure-applying rolls also include means (not shown) for preventing the processing fluid from escaping between the lateral margins of the sheets as the fluid is being spread therebetween, reference being suggested to the aforementioned application, Serial No. 112,941, for additional details of the design and construction of such rolls.

Camera 86 includes means for guiding tapered end section 20 of film unit 10 between pressure-applying rolls 114 and 116 in response to withdrawal movement of leader 70 past roll 114 to the front thereof and through opening 112. In the form shown in FIG. 5, this guide means comprises a guide bar 130 mounted on rear housing section 102 closely adjacent roll 114 and having a substantially straight rear edge extending from side to side of the camera housing and lying substantially in a plane through the convergent passage between pressure-applying rolls 114 and 116, i.e., tangent to the rolls. An intermediate section 132 of guide bar 130, comprising the forward edge of the guide bar and approximately equal in length to the width of leader 70, is curved toward roll 114 and is located with its forwardmost edge approximately in line with the forwardmost portion of roll 114. A pair of guide members 134 are mounted on the end sections of guide bar 130 adjacent intermediate section 132. The rear surfaces of guide members 134 are located in the plane of the rear edge of guide bar 130 and the two members are provided with facing end surfaces spaced from one another by a distance slightly greater than the width of leader 70. A guide plate 136 approximately equal in length to the width of leader 70 is mounted on forward housing section 88 and extends toward the rear of the camera intermediate guide members 134 adjacent guide bar 130. The rearmost edge of guide plate 136 may be curved, as shown, and is located substantially in the plane of the rear edge of guide bar 130 and rear surfaces of guide members 134. Intermediate section 132 of guide bar 130, guide members 134 and guide plate 136 cooperate with one another to define a guide passage 138 extending generally in a direction from front to rear of the camera and having a width, measured from side to side of the camera, just slightly greater than the width of leader 70, so that the leader may be moved through passage 138. It will be noted that tapered end section 20, at the leading edge thereof, is wider than leader 70 so that tapered end section 20 is unable to enter passage 138. The rear edges of guide bar 130 and guide plate 136 and the rear surfaces of guide members 134 function to support and guide tapered end section 20 of the film unit into the convergent passage between pressure-applying rolls 114 and 116.

In the loading and operation of the camera, the forward and rear housing sections are pivoted apart from one another and a film pack 40 is positioned within the forward housing section with the forward wall of the pack resting against section 92 of the forward wall of forward housing section 88, and with leaders 70 and leader 78 projecting from the pack extending across and to the rear of guide plate 136 and end wall 89. Rear housing section 102 is then pivoted into the operative position shown, causing the intermediate section 132 of guide bar 130 to engage the leaders displacing them forwardly so that they extend through passage 138 toward the forward wall of the camera, past pressure-applying roll 114 and through opening 112 in end wall 89. As a leader 70 is withdrawn from the camera through opening 112, tapered end section 20 is withdrawn from the pack and, being unable to enter passage 138, is guided by the guide bar, guide members and guide plate into the convergent passage between the pressure-applying rolls. Leader 70 is pulled from the camera until it and tapered end section 20 are in the positions shown in FIG. 6, at which portions of leader 70 are subjected to a shearing or tearing force where they join other portions of the leader adhered to tapered end section 20. Continued pulling on the leader causes it to tear away from the tapered end section so that the leader does not interfere with withdrawal of the film unit between the pressure-applying rolls.

The guide means of the invention also cooperate to perform the additional function of promoting tearing of leader 70 at arms 71 during withdrawal movement of each leader from the camera. It will be noted in the drawings, particularly in FIG. 6, that leader 70 is pulled between guide members 144 (or guide members 134 in FIG. 5), but arms 71 are unable to move between the guide members. The guide members include rear facing edges at the junctures of their rear and inner facing surfaces against which arms 71 are drawn during withdrawal of the leaders, tending to promote the tearing of the arms from the leaders.

In the position of the film unit shown in FIG. 6, the leading end section of the film unit extends between, but is not gripped by, the pressure-applying members. This condition can be assured in two ways. In a camera construction in which one of the rolls include shoulders at the ends of its intermediate section for spacing apart the intermediate sections of the rolls, the leading end section of the leader may be thinner than the gap between the rolls and being tapered is not gripped by the rolls until advanced during the second withdrawal step to the extent that it becomes engaged between the shoulders on one roll and the other roll. An alternative method is to provide for a predetermined minimum gap between the rolls and make the leading end section initially advanced between the rolls, thinner than this fixed minimum gap.

During the initial withdrawal movement of the film assemblage, photosensitive sheet 12 is guided by the side wall 46 of film pack container 42 until the photosensitive sheet is superposed with second sheet 14 whereupon the two sheets are guided by the side walls of the film pack container. The side walls of the film pack container as well as a bar 150, described more fully hereinafter, engage first section 18 of leader sheets 16 and leading end section 30 of carrier sheet 24 tending to properly orient the film unit with respect to the direction of withdrawal of the film unit between and in the grip of the pressure-applying rolls. In an alternative embodiment (not shown) of the apparatus, means such as springs may be provided adjacent the ends of rolls 114 and 116 extending into the path of movement of the film unit between the rolls for engaging the lateral edges of the film units to properly align the film unit with respect to its direction of movement. For an example of such a structure including spring means for aligning the film unit, reference may be had to U.S. Patent No. 3,132,572, issued May 12, 1964 in the name of Rogers B. Downey.

Prior to exposing a film unit and withdrawing the film unit from the camera between the pressure-applying rolls to effect its processing, cover sheet 76 is withdrawn by pulling leader 78 through opening 112 until leader 78 becomes detached from the cover sheet thereby advancing the leading end portion of the cover sheet between the pressure-applying rolls and through opening 110 where the cover sheet may be grasped for withdrawing it from the camera.

Another form of guide means, designated 140, is illustrated in FIG. 6 of the drawings. Guide means 140 is similar in construction to the guide means shown in FIG. 5 and comprises a guide bar 142 and two guide members 144. The guide bar and guide members of guide means 140 may comprise portions of a single element, the guide bar and guide members may comprise three separate elements. Guide means 140 are mounted on forward housing section 88 adjacent forward roll 114 with the rearmost surfaces of guide members 144 disposed approximately in a plane tangent to the surfaces of rolls 114 and 116. The spacing between the facing surfaces of guide members 144 is slightly greater than the width of leader 70 but less than the narrowest portion of tapered end section 20 so that leader 70 may pass between guide members 144 while tapered end section 20 is supported on and guided by members 144 between the pressure-applying rolls. The intermediate secton of guide bar 142 and guide members 144 cooperate with one another and roll 114 to define what may be termed a passage through which leader 70 is guided to the front of roll 114 and through opening 112.

Film withdrawal passage 110, in the lower end wall of the camera housing, is at least equal in width to the width of the film unit, whereas opening 112 need be of a width only sufficient to allow the passage of leader 70. It is desirable to allow only one leader at a time to project from the camera where the leader may be grasped; and this is desirable to prevent the operator from accidently pulling the wrong leader, or pulling more than one leader at a time. For this purpose, end wall 103 is provided with a recess, designated 146, adjacent passage 112 for holding the leading end sections of leaders 70. The leading end sections, designated 80, of leader 70, are folded back upon themselves and each leading end section is detachably adhered to the leader of the preceding film unit, with the leading end section 80 of the first (to be exposed) film unit being attached to leader 78. The folded leading end sections 80 of leaders 70 are contained within recess 146 which is provided with a resilient cover element 148. As leader 78 or a leader 70 is withdrawn through opening 112, the leading end section 80 of the next succeeding leader 70 is unfolded and withdrawn from recess 146 where the leading end section may be grasped for pulling the leader from the camera. By virtue of this arrangement, only one leader at a time extends outside of recess 146 in position to be engaged and withdrawn. A convenient means for detachably securing each leading end section 80 to the previous leader is shown and comprises providing an opening 82 in each leader 70 adjacent leading end section 80 thereof and in leader 78. A piece of pressure-sensitive adhesive tape is secured to the leader across opening 82 so that the adhesive surface of the tape will contact the leading end section 80 of the next succeeding leader through opening 82.

As a photosensitive sheet 12 is being drawn within the pack around curved end 60 of the pressure plate into superposed relation with a second sheet 14, the second sheet tends to move due, for example, to friction between the various sheet materails. Means are provided in the camera for restraining the second sheets 14 against such movement and, in the form shown, comprise an elongated bar 150 pivotally mounted intermediate its ends in a housing 152 mounted on rear wall 104 within chamber 108. Bar 150 is biased by a spring 154 into a forward position and includes end sections extending forwardly across the end portions of withdrawal passage 56 in container 42 toward and into engagement with guide members 134. The end sections in this position, engage the leading edges of second sheets 14 adjacent the sides thereof for prevening movement of the second sheets toward the pressure-applying rolls. Spring 154 is of sufficient strength to resist the relatively small force exerted by the second sheets due to frictional eengagement with the other sheets, but permits bar 150 to be pivoted rearwardly sufficiently to allow the withdrawal of a second sheet 14 when the latter is pulled from container 42 in superposition with a photosensitive sheet 12. The U-shaped opening 66 in rear wall 54 (mentioned earlier) is provided to accommodate housing 152, a portion of which extends into container 42 through opening 66.

In order to process a film unit following exposure thereof within the camera, the operator is required only to grasp leader 70 of the film unit projecting from the camera and apply tension to the leader until the leader becomes detached from the film unit. During withdrawal movement of the leader, it is unnecessary to take any special precautions to see to it that the leader is withdrawn precisely in the proper direction. After the leader becomes detached, the operator then grasps tapered end section 20 of the film unit which, during withdrawal of the leader, was advanced between the pressure-applying rolls and from the camera to an extent permitting end section 20 to be grasped; and applying tension to the end section to withdraw a film unit from the camera between the pressure-applying rolls. Again no special effort is required to insure withdrawal of the film unit in a particular direction since the direction of withdrawal movement and the orientation of the film unit during withdrawal movement are fixed as soon as the film unit is gripped by the pressure-applying rolls which is immediately after withdrawal movement is resumed. During the interval between the two withdrawal steps, forces are exerted on the film unit within the camera housing to properly orient the film unit with respect to the direction of withdrawal between the rolls.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. In a photographic process in which a photographic film element is manually moved within a photographic apparatus toward and between a pair of juxtaposed pressure-applying rolls and directly from said apparatus, the steps of:

manually engaging a leader attached to said film element and withdrawing said leader from said apparatus to move said film element within said apparatus toward and between said pressure-applying rolls;

discontinuing the application of withdrawal force to said film element with a leading end portion of said element extending between said rolls and from said apparatus free to move laterally with respect to the direction of movement of said element when between and in the grip of said rolls;

during and after movement of said film element, predeterminedly orienting said film element with respect to said direction of movement of said film element between said rolls; and thereafter manually engaging said leading end portion exterior of said apparatus and withdrawing said film element between said rolls so that said predeterminedly oriented film element is gripped by said rolls substantially immediately as withdrawal movement of said film element is resumed.

2. The photographic process of claim 1 in which said leader is detached from said film element when withdrawal movement of said film element is discontinued.

3. The photographic process of claim 1 in which said leader is attached to said film element at a position thereon spaced from the leading end of said film element toward the trailing end thereof, and said leader is withdrawn from said apparatus past and to one side of both of said pressure-applying rolls while said leading end of said film element is guided between said pressure-applying rolls and from said apparatus to a position at which said leading end can be engaged manually.

4. The photographic process of claim 3 in which withdrawal force is applied to said leader until it becomes detached from said film element thereby discontinuing withdrawal movement of said element with said leading end of said element located just short of a position at which said film element is gripped by said rolls.

5. The photographic process of claim 1 in which the medial portions of said pressure-applying rolls are spaced from one another to provide a gap therebetween having a width at least equal to the thickness of said leading end of said film element.

References Cited by the Examiner

UNITED STATES PATENTS 3,079,849    3/63    Wareham _____ 95—13
3,080,805    3/63    Hamilton _____ 95—13

NORTON ANSHER, *Primary Examiner.*